June 28, 1960     A. P. STEWART, JR     2,942,985
PROCESS AND APPARATUS FOR PREPARATION OF FLAVOR BASES
Filed May 27, 1957
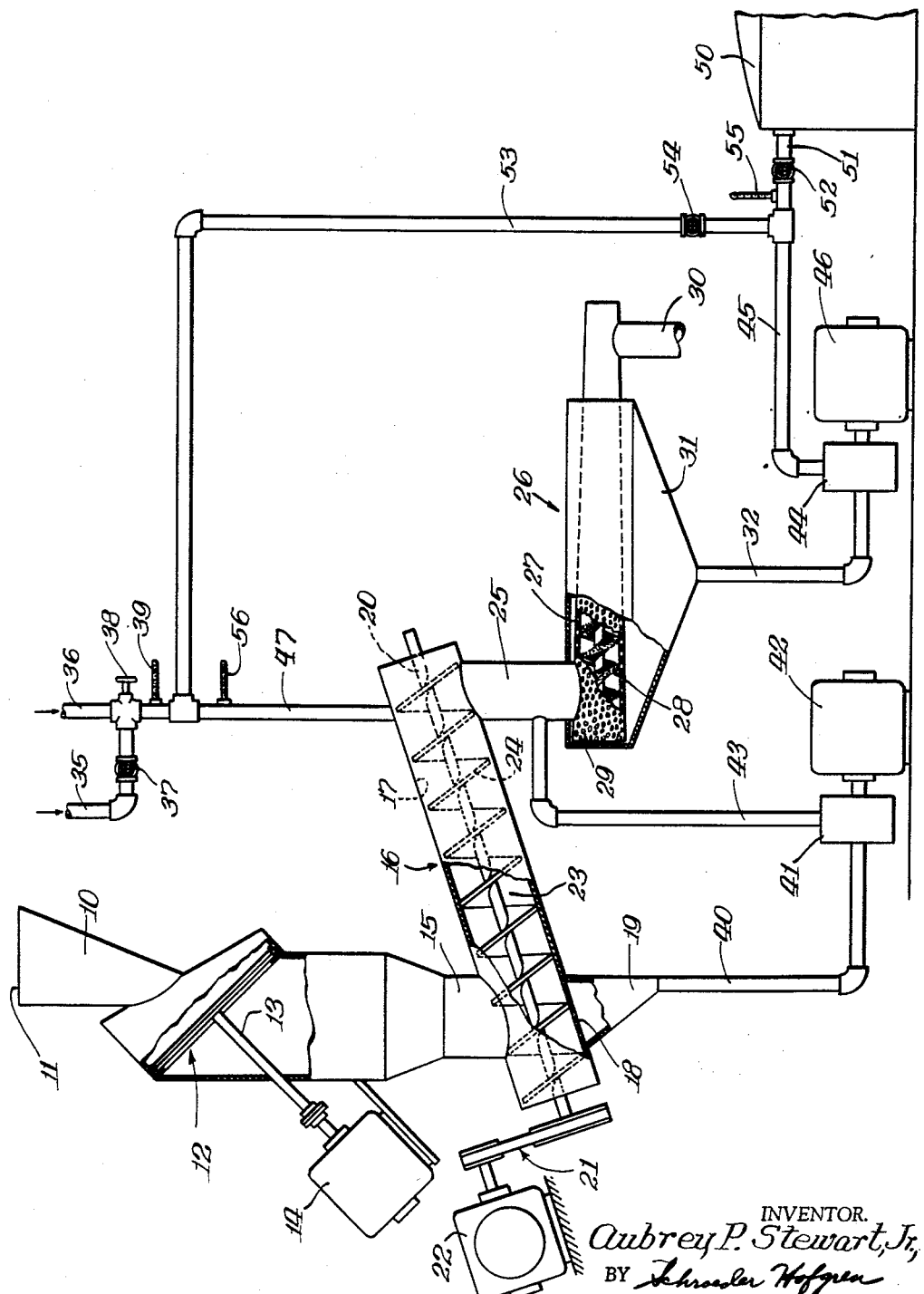
INVENTOR.
Aubrey P. Stewart, Jr.,
BY Schroeder Hofgren
Brady & Wegner
Atty's.

United States Patent Office 2,942,985
Patented June 28, 1960

2,942,985

PROCESS AND APPARATUS FOR PREPARATION OF FLAVOR BASES

Aubrey P. Stewart, Jr., 3950 Lake Shore Drive, Chicago 13, Ill.

Filed May 27, 1957, Ser. No. 661,651

18 Claims. (Cl. 99—140)

This invention relates to new and improved processes and apparatus for preparing flavor bases from fruits or the like including peparing flavor bases from whole citrus fruits, such as oranges, lemons, limes, tangerines and other fruits where the flavor is contained in both the peel and the juice. More particularly, this invention relates to methods and apparatus for extracting flavor from fruits or the like in such a manner as to retain the desirable aromatic flavor constituents and the natural pectic substances without the formation of bitterness or undesirable flavor qualities.

Flavor bases are presently made and sold in concentrated form, either sweetened or unsweetened, so that they may thereafter be diluted with water to form flavored soft drinks, such as orange drinks, lemonade and the like.

It is common practice to prepare citrus beverage bases by blending together separately produced ingredients including citrus oil, concentrated citrus juice brominated oil and gum stabilizer. During the process of preparing the citrus oil and concentrated citrus juice much of the natural flavor of the fruit is lost, as well as the natural pectic substances therein, and perhaps also other natural substances as of yet undetermined value. The foregoing losses result from the presently used methods for preparing the ingredients wherein, in the preparation of the citrus oil, all constituents of the peel, except the oil and oil-soluble chemicals, are discarded and the oil is then refined by washing and centrifuging. In the performance of the latter steps all water soluble components are lost. Similarly, in producing the citrus juice ingredient, the fruit juice is concentrated by evaporation under vacuum which results in the loss of a significant amount of flavor, especially those flavor components which are of an aromatic character. The usual methods of preparing citrus oil and concentrated juice result in the loss of the natural pectic substances to a degree sufficient to cause the flavor bases so made to be thin and to require the addition of gum stabilizer to give a desirable body or viscosity and to provide a stable emulsion of the oil. Brominated oil or other substances not natural to fruit juices are also customarily added to provide the desired cloudy appearance when the flavor bases are diluted with water in the preparation of beverages, since the natural fruit suspendable solids are removed in the processing According to the present invention, however, I am able to produce flavor bases in which substantially all of the flavor forming components are retained as are the pectic substances in the natural fruit. As a result, the flavor base is a truer representation of the natural flavor, and the addition of clouding agents, such as brominated oil, or thickening agents, such as gum stabilizer, is superfluous.

Certain citrus fruit juices, e.g. the juice of navel oranges, have a tendency to become bitter after relative short periods of storage. I have found, however, that if such juices are subjected to a heat treatment for a certain period, the production of bitter-flavor-forming fractions is inhibited (or such fractions are removed) and such juices in normal or concentrated form may be maintained in storage for a long period without developing a bitter taste.

A further feature and advantage of the present invention is the fact that processes and apparatus are provided which lend themselves to continuous production of concentrated flavor bases as distinguished from the batch methods heretofore commonly employed.

In accordance with one aspect of the present invention, a concentrated flavor base is prepared by mechanically masticating the fruit to break down the cellular structure, thereby forming a shredded mass of fruit, and removing the flavor forming components therefrom by passing through the shredded mass heated, previously extracted juice and flavor components. If desired, the shredded fruit may be subjected to at least two such extractions in separate stages, so as to remove substantially all of the flavor forming components.

By maintaining the flavor base extract so formed at an elevated temperature for some time after extraction, the occurrence of bitter-flavor-forming fractions is inhibited.

The foregoing and other advantages and features of the present invention will be more fully understood from a reference to the accompanying drawing, illustrating an exemplary embodiment of the invention in which:

Fig. 1 is a diagrammatic view, in the nature of a flow chart, illustrating one form of the apparatus usable in the process of the invention.

While this invention is susceptible of embodiment in many different forms, there is shown in the drawings and will herein be described in detail one embodiment, with the understanding that the present disclosure is to be considered as an exemplification of the principles of the invention and is not intended to limit the invention to the embodiment illustrated. The scope of the invention will be pointed out in the appended claims.

Referring to the drawing there is shown an apparatus for continuously producing flavor bases of fruits or the like in accordance with the teachings of the present invention. For this purpose there is provided a hopper 10 having an inlet opening 11 through which fruit may be introduced into the hopper in relatively large quantities. Near the bottom of the hopper is a shredder or shedding device 12 provided with cutting blades and rotated by means of a shaft 13 driven by a suitable electric motor 14. While many forms of shredding devices may be used, I prefer the particular type shown in the Hill Patent 2,086,911.

From the shredder, the shredded fruit and juice may drop through a tube 15 to the lower end of a first extractor stage 16. The first stage extractor includes an upwardly inclined tube forming a passage 17 having a foraminous screen 18 at its lower end overlying a conduit 19, so that juices and moderately fine solid particles may pass through the screen and into the conduit. Within the tube 17 there is provided a rotatable shaft 20 adapted to be driven by suitable pulleys and belts 21 connected to a driving motor 22. The shaft 20 forms a part of a screw conveyor having flights 23 provided with serrated outer edges 24, so that liquid may drain downwardly in the tube.

Communicating with the upper end of the tube 17 is a downwardly directed tube forming passage 25 opening at its lower end to a finisher 26. The finisher includes a generally conical screen 27 having therein a rotatably mounted spiral brush 28 arranged to be rotated so as to move fruit pulp 29 therein toward a discharge outlet 30. The finisher 26 is formed with a conical bottom 31 communicating with a pipe 32.

A source of steam 35 and a source of water 36 are provided, each controlled by suitable valves 37 and 38, so that the temperature of the water from the source 36 may be regulated. To assist in such regulation a thermometer 39 is provided. Heated water may thus be introduced into the pipe 47 and thence into the tube 17, so that it may percolate downwardly through the tube to the screen 18.

The passage 19 communicates with a pipe 40 connected to the inlet of a pump 41 driven by a suitable motor 42. The outlet of the pump discharges into a pipe 43 in turn discharging into the tube 25.

A second pump 44 has its inlet connected to the pipe 32 and its outlet to a pipe 45 with the pump 44 being suitably driven, as by the motor 46. The pipe 45 communicates with a storage tank 50 through the medium of a conduit section 51 controlled by a valve 52 and also with a pipe 53 controlled by a valve 54 and communicating with the pipe 47.

Suitable thermometers 55 and 56 are provided for observing and regulating the temperature in the lines 51 and 47, respectively.

As illustrative of my process and the use of the apparatus a preferred method of preparing orange flavor base is as follows:

Oranges are fed to the hopper 10 of the apparatus at a rate of 30 pounds per minute. The steam and water valves 37 and 38 are set to introduce water into the upper end of the passage 17 at the rate of 10 pounds per minute. This results, on the average, in a pulp discharge rate from the finisher 26 of 19 pounds per minute and a discharge of liquid extract into the line 45 at the rate of 21 pounds per minute.

It is an important part of my invention to surround the shredded fruit with extraction medium immediately and almost simultaneously with the time the cellular structure of the fruit is exposed—thus starting the temperature and time control of enzyme activity immediately. The continuous, counter-current type of extraction is also important to the efficiency of the extraction and control of enzyme activity.

Upon start-up of the apparatus the entire volume of extract from the finisher is preferably recirculated through the extractor 16 until the equipment is filled with liquid. When this has been accomplished, the valve 52 controlling the line 51 to the storage tank is opened so that 21 pounds per minute of liquid extract is run into the storage tank. In normal operation the water introduced at the upper end of pipe 47 is regulated as to temperature, so as to produce an extract-water-mixture temperature, entering the storage tank 50 of the order of 120° F. In the example given, a water temperature of about 190° F. will accomplish this result. The temperature of the influent extraction water is dependent upon the desired temperature of final extract-water-mixture.

The water-extract-mixture passes downwardly through the extractor passage 17, passing by the serrated edges 24 of the screw conveyor and picking up from the shredded fruit therein components of flavor which ultimately reach the screen 18 and conduit 19. The pump 41 then directs this mix into the line 43 for discharge into the passage 25 entering the finisher. In the finisher the liquid mixture is further screened to remove coarse particles and seed fragments and the finisher, of course, removes extract clinging to the pulp before the latter is discharged through the outlet 30.

The liquid extract from the finisher is in part recirculated through the extraction tube 17 in order to build up flavor concentration and the balance directed to the storage tank 50.

Another method of operating is to connect line 43 to a separate finisher to remove the coarser fragments which pass through screen 18 and the extract from this latter finisher is then joined directly with line 32 for recirculation and pumping to the storage tank.

When dealing with fruits whose juices have a tendency to become bitter in storage, I maintain the extract level in the storage tank at a volume to allow a holding time of the extract therein sufficient to inhibit the occurrence of bitter-flavor-forming fractions. For most cases, for example, navel oranges, a holding time of approximately 30 minutes (at 120° F.) before pasteurization and homogenization is ample. Homogenization is accomplished at approximately 1000 pounds per square inch gauge pressure and pasturization is accomplished by heating the extract to a temperature of 205° F. with a holding time of approximately 10 seconds, followed by cooling to 40° F. in storage prior to canning.

The flavor base extract can be canned without other additions for use as a flavor base wherein the ultimate user may add sugar, water, etc. to suit his tastes and needs. If desired, citrus acid and sweetener may be added, for example, for a complete orange drink base, approximately 0.5 pound anhydrous citric acid together with 17 pounds of sucrose per gallon of extract may be added to yield a base which can be diluted with water to an orange drink or an orange sherbet. The extract, sweetened or unsweetened, may be canned by heating it to 190 F., filling hot into cans and immediately cooling or, preferably, may be high-temperature, short time sterilized at 210° F. for 5 seconds, cooled to 80° F. within 10 seconds and aseptically canned.

I have found that by maintaining an extract temperature of 120° F. there is a maximum extraction of desirable flavors without extraction of excessive amounts of bitter or bitter-taste-producing substances which cannot be removed by subsequently holding the extract at an elevated temperature as described. Furthermore, I have found that at 120° F. there is excellent retention of substances, probably pectin in nature, which produce good viscosity and body which are permanently preserved after the pasteurization treatment. For example, I have found that at 60° F. extract temperature the efficiency of flavor extraction is relatively low (without excessive recirculation) and the amount of natural orange oil in the extract is also low. Also at this temperature there is initiated an immediate loss of viscosity which occurs during the period of extraction and the period required to homogenize and pasteurize the extract. At 90° F. there is a more satisfactory flavor extraction but a rather rapid loss in viscosity, which necessitates immediate pasteurization to prevent excessive viscosity loss—making it impossible to hold the extract at 90° F. for approximately the 60 minutes I have found necessary, at this temperature, to remove bitter flavor. At temperatures higher than 120° F., e.g. 145° F., there is caused an extraction of bitter flavor or bitter-flavor precursors which remain in the product even after long holding at elevated temperatures prior to pasteurization.

I believe that an explanation of my discovery is that there are certain enzymes or an enzyme which, when liberated during the destruction of the cellular structure of the fruit will cause the loss of pectin. This loss is particularly rapid below 120° F. and therefore when the fruit flavors are extracted below 120° F. it is important to immediately pasteurize the extract to destroy the enzyme or enzymes which cause this loss of pectin. On the other hand I believe there are certain enzymes or an enzyme which functions at temperatures in the region of 120° F. which remove the bitter flavor which is sometimes extracted especially from navel oranges. This removal action is apparently enhanced by the presence of pectin. Thus, it is desirable to extract at a temperature sufficiently high to prevent the too rapid destruction of pectin and yet at a temperature not so high that too much bitter flavor is extracted nor so high that the enzymes which can remove the bitter flavor are destroyed or rendered incapable of removing bitter flavor components. In general, I have found that 120° F. extract temperature is optimum with a range of 90° to 145° F.

The amount of recirculation of extract through the extraction tube 17, where flavor components from the freshly shredded fruit are extracted, will determine the degree of flavor concentration. This flavor concentration will also be determined by the ratio of amount of extraction water entering the extraction tube in relation to the amount of fruit being fed. The amount of recirculation is, however, limited by the size of the equipment and the efficiency of the finisher. Also, too great a recirculation rate and volume will result in excessive time some of the extract is in the system with resulting loss of viscosity of the final product. Also, since recirculation primarily increases flavor concentration of extractable constituents from the non-juice fraction, it is possible with excessive recirculation to obtain a final flavor which is out-of-balance with respect to the juice and non-juice fractions. I have found that for optimum flavor from oranges it is best to not recirculate over four volumes per volume of extract removed from the system, for lemons not over four volumes, for limes not over two volumes, and for tangerines not over three volumes. For fruits such as mango, where the flavor is less from the peel than from the soluble constituents of the fruit itself, it is not necessary to recirculate over two volumes.

The ratio of extraction water to fruit is optimum at approximately one pound water to three pounds of fruit. A much higher ratio of water produces a flavor base which is not of sufficient strength for commercial use and a much lower ratio does not provide sufficient efficiency in extraction, although if a highly concentrated flavor base is desired, the water dilution can be omitted and only the juice recirculated. The normal operating range is approximately ¼ pound to 2 pounds water to one pound of oranges. Limes, lemons and grapefruit can be extracted with as much as one pound water to one pound of fruit because the flavor level in these fruits is naturally higher than in oranges.

In fruits where pectin destruction should be inhibited at least sufficiently long to allow bitter flavor removal activity prior to pasteurization and complete enzyme destruction, an extraction temperature of 90° F.–145° F. is required. The extract is then held at an elevated temperature for a period of time after extraction to allow for the removal of bitter-flavor-forming components. The holding period between time of extraction and pasteurization is most critical in the case of navel oranges with 30 minutes being optimum at 120° F. and lesser times at both higher and lower temperatures. Lemon and lime flavor extracts are best held at elevated temperatures no longer than three hours before being pasteurized to prevent the development of a "woody" flavor and preferably held about 30 minutes.

By using my apparatus and method I have found it possible to produce citrus-flavor bases which are superior in flavor, especially the natural aromatic citrus fruit flavors, than other products of similar or even much higher fruit solids content. The stability and body of the citrus flavor bases produced by my invention are superior to other bases of similar fruit solid content unless the other bases included added thickening agents (such as gum stabilizer) and/or emulsifiers. I have found that my invention allows the most economical production of citrus flavor bases in terms of flavor retained from the whole fruit.

Although the primary purpose of my invention is to prepare citrus flavor bases, the apparatus and methods can also be used in the extraction of flavor advantageously from such materials as coconut meat, mango, guava, etc., where much extractable flavor exists in the non-juice portion.

I claim:
1. The method for preparing a flavor base of fruits, comprising shredding the fruit to produce a shredded mass thereof, moving the mass from a first xtractor stage toward a second extractor stage, passing liquid at a temperature between 90° F. and 145° F. counter-currently through the moving mass to produce a liquid mix of extracted flavor components, continuing the movement of the mass to the second extractor stage, passing the mix through the mass at the second extractor stage to further extract flavor components therefrom, directing a portion of the resulting liquid mix to storage and mixing the balance of the resulting liquid mix with the liquid passing through said first extractor stage.

2. In a continuous method for producing flavor bases of fruits wherein the flavor components are extracted in a liquid including juices from the fruit, the steps which comprise adding heated water to said liquid to produce water and liquid mix having a temperature between 90° F. and 145° F., and then continuously passing the heated mixture through a shredded mass of fruit to extract flavor components therefrom.

3. The method of claim 2 in which said mixture is maintained at a temperature of the order of 120° F.

4. A continuous method for preparing flavor bases of fruits, comprising continuously shredding a succession of fruit, continually moving the shredded fruit through an extractor stage, mixing heated water with a liquid and flavor component mix to heat the resulting mixture to a temperature between 90° F. and 145° F., passing the mixture through the moving fruit to extract flavor components therefrom, directing a portion of the resulting liquid and flavor component mix to storage, and directing the balance of the resulting liquid and flavor component mix to the extractor stage to be mixed with the heated water supplied thereto.

5. The method of claim 4, in which said water is mixed with said liquid at a rate of from ¼ to 2 pounds of water per pound of fruit.

6. The method of claim 4 in which said portion of the resulting liquid and flavor component mix is held in storage at an elevated temperature for a time sufficient to prevent the development of bitter-flavor-forming fractions in the mix.

7. The method of claim 6, in which said elevated temperature is such as to preserve the pectin in the extract.

8. The method of claim 6, in which said liquid mix is held in storage for approximately 30 minutes at a temperature of the order of 120° F.

9. A continuous method for forming flavor bases of fruits which comprises shredding the fruit to produce a shredded mass thereof and to extract juice therefrom in the absence of substantial pressure on the shredded mass, diluting the extracted juice and raising its temperature to between 90° F. and 145° F. and then recirculating the heated diluted juice through the shredded mass.

10. The method for preventing the formation of bitter taste producing fractions in the juice of navel oranges which comprises maintaining the juice substantially immediately after extraction at a temperature of the order of 120° F. for approximately 30 minutes to inhibit the formation of said fractions.

11. The method for preventing the formation of bitter taste producing fractions in citrus juices which comprises maintaining the juices substantially immediately after their extraction at a temperature of from 90° F. to 145° F. for a period sufficient to inhibit the formation of said fractions.

12. A continuous method for forming flavor bases of citrus fruits which comprises shredding the fruit to produce a shredded mass thereof and to extract juice therefrom, diluting the extracted juice with water and raising the temperature of the water and juice mixture to the order of 120° F., recirculating the heated water and juice mixture through the shredded mass to concentrate the flavor components thereof and then maintaining the concentrated mixture at a temperature of the order of 120° F. for approximately 30 minutes.

13. Apparatus for preparing flavor bases of fruits, comprising means for shredding the fruit to extract juice therefrom and produce a mass of shredded fruit, means for diluting the juice and raising its temperature and means for passing the heated diluted juice through said shredded fruit.

14. Apparatus for preparing flavor bases of fruits, comprising a hopper, a shredding device having an inlet communicating with the hopper successively to shred fruit fed to said hopper, means forming an inclined passage, a foraminous screen at the lower portion of said passage, means for feeding shredded fruit from the shredder to said passage above the screen, a screw conveyor in said passage, means for rotating the conveyor to move shredded fruit from the lower portion of the passage to a discharge opening at the upper end thereof, a finisher communicating with the upper end of said passage, said finisher having an inlet for receiving shredded fruit from the passage and a discharge outlet, a source of heated water, and a liquid circuit including means for conducting a portion of the liquid passing through the screen to storage and the balance of liquid to the upper end of said passage, and means for mixing heated water with the liquid at said upper end of the passage.

15. Apparatus for preparing flavor bases of fruits, comprising means for shredding fruit to reduce it to a shredded mass and extract juice therefrom, means for moving the mass from the shredder toward a discharge outlet, means for heating and diluting the extracted juice and means for circulating and recirculating the heated diluted juice through the mass as it is moved toward said discharge outlet.

16. The method for preparing flavor bases of citrus fruits, comprising extracting the flavor components of the fruit in a liquid mixture, including the juice thereof, said extraction being under temperatures between 90° F. and 145° F. to provide a relatively high pectin content in the extract.

17. The method for preparing flavor bases of citrus fruits, comprising extracting the flavor components of the fruit in a liquid mixture, including the juice thereof, said extraction being at a temperature above 90° F. to inhibit pectin destroying enzyme action, and below 145° F. to enhance the action of the mixture in preventing the formation and retention of bitter-flavor-forming elements and then pasteurizing and canning the extract.

18. The method for preparing flavor bases of citrus fruits, comprising extracting the flavor components of the fruit in a liquid mixture, including the juice thereof, said extraction being carried out at temperatures of the order of 120° F. to provide a relatively high pectin content in the extract, and then pasteurizing and canning the extract.

References Cited in the file of this patent

UNITED STATES PATENTS

| | | |
|---|---|---|
| 1,353,349 | Krafft | Sept. 21, 1920 |
| 1,989,231 | Gilliatt | Jan. 29, 1935 |
| 1,989,399 | Browne | Jan. 29, 1935 |
| 2,101,962 | Stokes et al. | Dec. 14, 1937 |
| 2,419,545 | Gray et al. | Apr. 29, 1947 |